United States Patent
Ponceleon et al.

(10) Patent No.: US 9,559,840 B2
(45) Date of Patent: Jan. 31, 2017

(54) LOW-BANDWIDTH TIME-EMBARGOED CONTENT DISCLOSURE

(71) Applicant: GLOBALFOUNDRIES Inc., Grand Cayman (KY)

(72) Inventors: Dulce B. Ponceleon, Palo Alto, CA (US); John Bernard Geagan, III, San Jose, CA (US)

(73) Assignee: GlobalFoundries Inc., Grand Cayman (KY)

( * ) Notice: Subject to any disclaimer, the term of this patent is extended or adjusted under 35 U.S.C. 154(b) by 91 days.

(21) Appl. No.: 14/057,741

(22) Filed: Oct. 18, 2013

(65) Prior Publication Data

US 2015/0110274 A1    Apr. 23, 2015

(51) Int. Cl.
*G06F 21/00* (2013.01)
*H04L 9/08* (2006.01)

(52) U.S. Cl.
CPC .......... *H04L 9/0822* (2013.01); *H04L 9/0872* (2013.01); *H04L 9/0891* (2013.01); *H04L 2209/60* (2013.01)

(58) Field of Classification Search
CPC ............................ H04L 9/3297; H04L 9/0819
See application file for complete search history.

(56) References Cited

U.S. PATENT DOCUMENTS

| | | | |
|---|---|---|---|
| 6,603,857 B1* | 8/2003 | Batten-Carew et al. | 380/44 |
| 7,321,660 B2 | 1/2008 | Mont | |
| 8,826,036 B1* | 9/2014 | Snodgrass et al. | 713/189 |
| 8,831,228 B1* | 9/2014 | Agrawal | H04L 9/0822 380/277 |
| 2005/0251491 A1* | 11/2005 | Medina | G06Q 20/3829 705/71 |
| 2006/0165233 A1* | 7/2006 | Nonaka et al. | 380/44 |
| 2009/0172411 A1* | 7/2009 | Kershaw et al. | 713/189 |
| 2009/0252325 A1 | 10/2009 | Reus | |
| 2011/0228942 A1* | 9/2011 | Fahrny et al. | 380/278 |
| 2013/0268771 A1* | 10/2013 | Blankenbeckler | H04L 9/08 713/189 |
| 2015/0371013 A1* | 12/2015 | Reckless | G06F 21/10 726/26 |

\* cited by examiner

*Primary Examiner* — Jeffrey Pwu
*Assistant Examiner* — William Corum, Jr.
(74) *Attorney, Agent, or Firm* — Heslin Rothenberg Farley & Mesiti P.C.

(57) ABSTRACT

Embodiments of the present invention relate to time delayed release of previously distributed digital content. In one embodiment, a method of and computer program product for low-bandwidth time-embargoed content disclosure are provided. A first cryptographic key is received. Encrypted content is received, encoded in a computer readable medium. A correction value is received. A predetermined function is applied to the first cryptographic key and the correction value to determine a second cryptographic key. The second cryptographic key is applied to the encrypted content to obtain decrypted content.

14 Claims, 4 Drawing Sheets

LOW-BANDWIDTH TIME-EMBARGOED CONTENT DISCLOSURE

BACKGROUND

Embodiments of the present invention relate to time embargoed content distribution, and more specifically, to time delayed release of previously distributed digital content.

BRIEF SUMMARY

According to one embodiment of the present invention, a method of and computer program product for low-bandwidth time-embargoed content disclosure are provided. A first cryptographic key is received. Encrypted content is received, encoded in a machine-readable medium. A correction value is received. A predetermined function is applied to the first cryptographic key and the correction value to determine a second cryptographic key. The second cryptographic key is applied to the encrypted content to obtain decrypted content.

DETAILED DESCRIPTION

Figure 1:
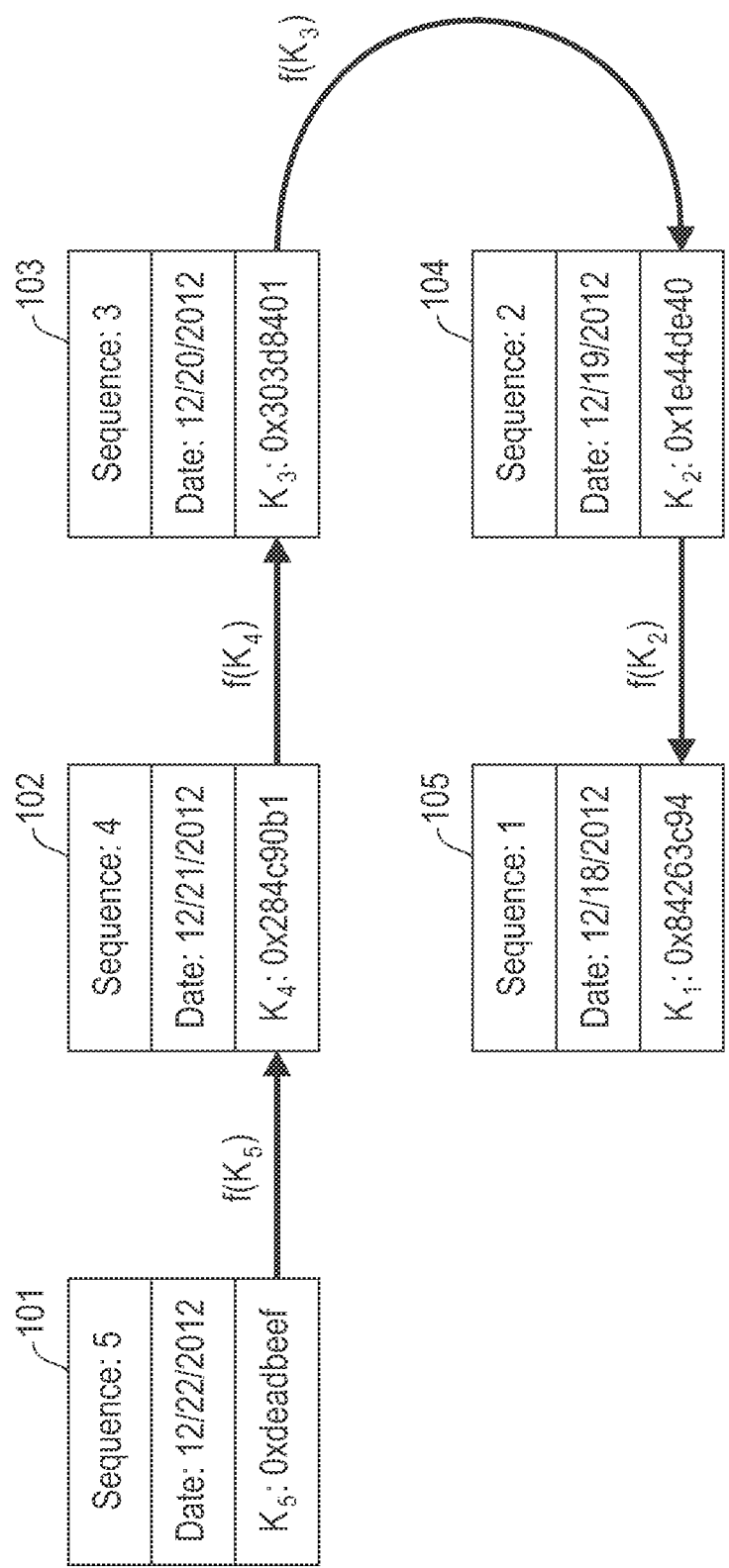
FIG. 1 depicts a key chain according to an embodiment of the present disclosure.

In certain content distribution scenarios, it is desirable to distribute the content in advance but keep the content inaccessible until some future time, determined by the distributor of the content. For example, digital movies may be distributed to cinemas in advance of their official release. In such circumstances, a movie is vulnerable to prerelease copying. This is referred to as release window piracy. Distribution prior to release allows content to be cached or staged at or near the consumer endpoint long before needed, avoiding concentrated bandwidth consumption at the time of release. The size of a digital movie is such that distribution on a just-in-time basis may be impractical or expensive, but a synchronized cinema release may be critical to the distributor. Other examples of content for which distribution prior to release may be desirable include embargoed press release, crop reports, software updates, movie and music. In each of these cases, the content distributor may have a substantial business or other interest in maintaining the confidentiality of the content until a particular date.

According to various embodiments of the present invention, content such as digital movies may be distributed in advance of release in a manner that restricts access to that content until a release time designated by the content distributor. The present disclosure may be applied to online content as well as physical media containing digital content. Physical media may be shipped to warehouses, placed on store shelves, or sold to consumer in advance of the release date. In both the physical and online cases, the content remains inaccessible until the date designated by the owner.

One approach to timed release of content would be to encrypt the content, distribute the content, and then distribute a decryption key at a designated time. Subsequent content may be encrypted with a different key to enable a different release date. In such a system, the content consumer must retrieve and store separate keys for all encrypted content. In cases where many different content distributions occur with different release dates, the consumer must manage a collection of many individual decryption keys. Storing content in an unencrypted form may expose it to piracy and may violate content distribution agreements. In addition, to further shield encrypted content from piracy, any keys resident with the protected content should also be protected, adding to the complexity of key storage.

Where a key is uniquely associated with particular content, it poses a privacy risk. In particular, where a content consumer requests or receives a certain key it may be inferred that they are attempting to access the associated content.

In one embodiment of the present invention, a one-way cryptographic function is used to generate a sequence of encryption keys, starting at a secret seed value. A key is generated at each iteration of the function. Each key is associated with a sequential release, which in one embodiment is tied to a particular date. The number of iterations of the function determines the maximum number of sequential releases supported by the key chain. Thus, the function must be applied by the content distributor a number of times equal to the maximum iteration value, and iteration of the one-way function produces a key associated with a decreasing sequence number.

Turning to FIG. 1, a key chain according to an embodiment of the present disclosure is depicted. A seed value 101 may be randomly determined or may be a known constant. From seed value 101, are generated additional keys 102, 103, 104, 105 by sequential application of a one way cryptographic function f. Each key is generated by application of the cryptographic function to its successor in sequence. Thus, $K_4=f(K_5)$, $K_3=f(K_4)$, $K_2=f(K_3)$, and $K_1=f(K_2)$. Alternatively, the first key in a sequence of length n may be described as $K_1=f^{\circ n}(K_n)$, where $\circ$ is used to signify composition and $K_n$ is the seed value.

In some embodiments, each sequential key is associated with a release date. Content is encrypted with the key associated with a desired release date. Content is distributed prior to the release date, and the appropriate key is not released until the release date. Once a content consumer has access to a given key, it may compute keys earlier in the sequence by applying the cryptographic function f. For example, as discussed above, $K_3=f(K_4)$. Thus, a content consumer is able to decrypt any content distributed prior to the current release date without storing multiple keys. However, where f is a strong cryptographic function, the content consumer is not able to compute a key that is later in sequence.

In general, a content consumer, given $K_n$, may compute any key $K_i$ where i<n, but cannot compute any key $K_j$ where j>n. Thus, key storage by the consumer is minimized.

In some embodiments, the key associated with the most recent release date is available through a publically accessible server. A content consumer may, by accessing such a server, retrieve the key necessary to decrypt any previously released content. A publically accessible server may be a web server, FTP server, or another server accessible through a network. In some embodiments, access to the key server may be restricted by authentication methods known in the art. In some embodiments, communications with the key server may be encrypted with methods such as SSL that are known in the art. Because a content consumer is able to retrieve only the most recently available key, the key provider is not able to infer which content the consumer is attempting to decrypt. In addition, the key distribution server may be accessible through anonymous means, allowing a content consumer to avoid disclosing any identifying information.

In some embodiments, keys are distributed through physical media. Examples include compact disks, DVDs, and magnetic stripes. In fact, the key may be distributed through non-digital media, for example, printed on a card.

In some embodiments, a pre-existing key management infrastructure is present at the content consumer. In such cases, time-based keys of the present disclosure may be distributed and stored according to the existing key management system. In this way, an existing system may be modified to include time-embargoed content. Key security may be provided by the existing key management infrastructure.

In some embodiments, the cryptographic one-way function may be AES-128. In such cases, the previous key in a key sequence is calculated by AES-128 decryption using a secret key of the content distributor. Creation of the previous key in a sequence is computationally easy, while derivation of a subsequent key is not computationally feasible.

To initialize a distribution system according to an embodiment of the present disclosure, a content provider selects a one-way function. The one way function is communicated to the content consumers. The content provider determines a maximum length of the key chain. The maximum length of the key chain may relate to a time increment and a time window. For example, if one key is desired per day for a year, then the maximum chain length may be 365 keys. The content provider generates or selects a seed value, and then repeatedly applies the one-way function to generate the chain of keys. The one-way function will be applied once for each key in the chain beyond the seed value. The content distributor may then publish the key according to the time increment, for example, daily.

A content consumer may automatically retrieve the current key on a schedule or may manually retrieve a key at the time that content is decrypted. Alternatively, the user may receive the current key via some other means. Examples include a phone recording, conventional mail, or a third party communication. A user may enter the key manually.

In some embodiments, the timed key is applied to generate an intermediate value that may be used as a parameter to a second decryption operation. In some embodiments, content is encrypted with a combination of a unique media key $K_m$ and a time-embargoed key discussed above. In such embodiments, existing broadcast encryption schemes such as those described in AACS may be used in combination with the time-embargoed key chains of the present invention. In some embodiments, content to be distributed is encrypted by the Media key xored with a time embargoed key. Such an implementation allows both time-embargoing of content and device authorization and revocation.

In some embodiments, the content distributor maintains multiple key chains with the same release schedule. In such embodiments, different consumers or groups of consumers may be assigned to a given chain and the content is released such that it may be accessed using keys from any of the chains. In this way, group access may be revoked to later content by no longer releasing the key from a given chain. Similarly, a chain may be associated with a group of content rather than a group of consumers.

If a key chain is cracked, then future content releases may switch to a new chain. In addition, updated keys may be distributed via a broadcast encryption scheme such as NNL. Distribution via NNL enables revocation of a given key sequence. Individual players may be granted access to different release dates. For example, content consumers authorized for "preview" may be given access to a later key in a sequence than other content consumers. Authorization to view a preview might be obtained by making an additional payment to the content provider.

In some embodiments, the encrypted content is distributed with a verification block that allows a content consumer to verify whether a given application of the one way function has yielded the correct key for the content. In some embodiments, a content consumer simply tries each key in sequence until one is successful. In yet other embodiments, content is distributed with an unencrypted sequence number and the current release key is distributed with an index number. In such embodiments, the content consumer may determine whether the content is decryptable by comparing the release key sequence number to the sequence number associated with the content. In addition, a content consumer may determine the number of function applications necessary by this comparison.

Figure 2:
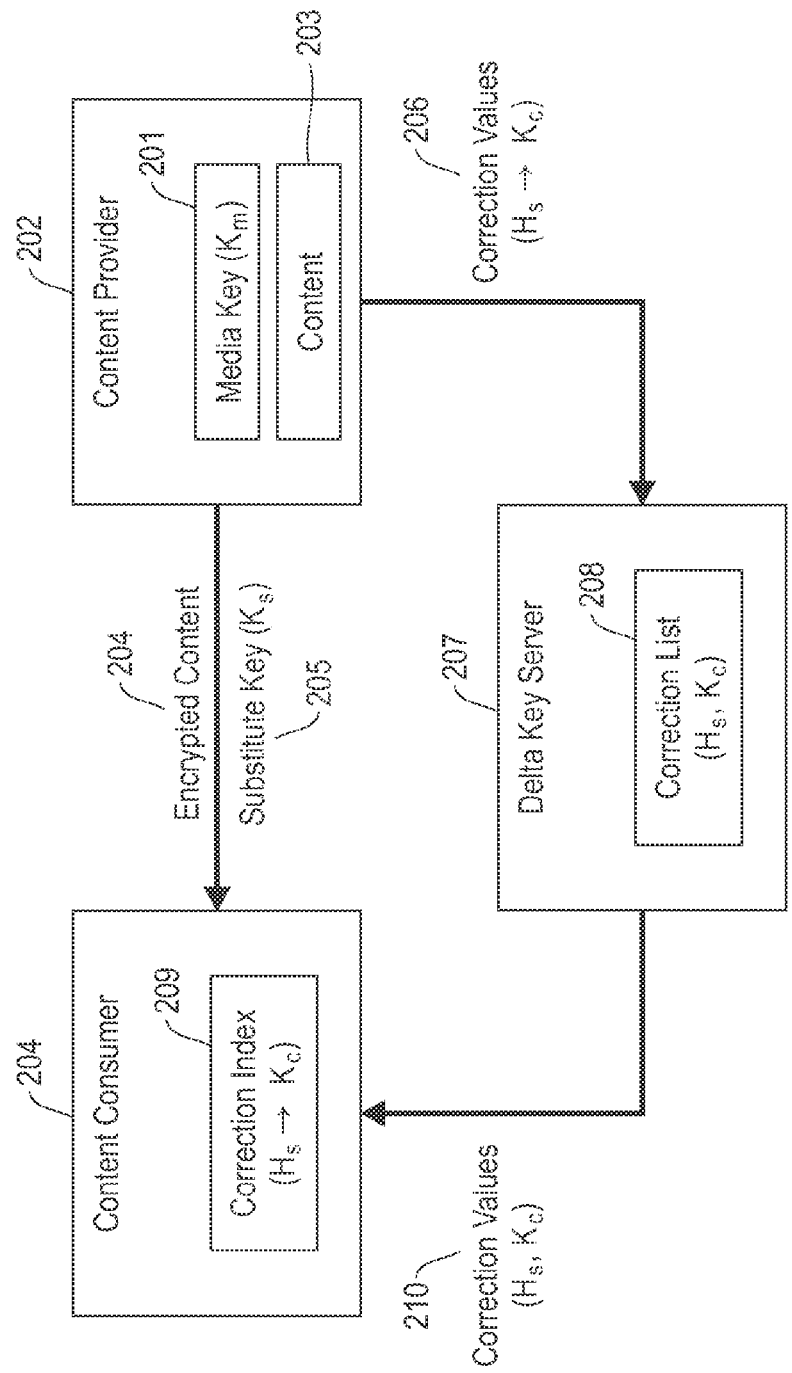
FIG. 2 provides a schematic representation of delta key distribution according to an embodiment of the present disclosure.

Referring to FIG. 2, in another embodiment an ad-hoc out-of-order un-embargoing of content is provided through embargoed deltas with hash lookup. In comparison to the key chain embodiment discussed above, this requires larger key storage, but provides finer grained control over content release.

In embargoed delta embodiments, a media key $K_m$ 201 is determined by a content provider 202. The media key 201 is used to encrypt content 203 to create encrypted content 204 for distribution. A substitute key $K_s$ 205 is also computed by the content provider. The encrypted content and the substitute key are provided to a content consumer 204. Both the content provider 202 and the content consumer 204 compute a hash $H_s$ of the substitute key $K_s$. The content provider 202 computes a correction value $K_c$ such that $f(K_s, K_c)=K_m$ for some predetermined function f and sends associated FL and $K_c$ 206 to delta key server 207 for storage in a list 208.

The content consumer cannot decrypt the encrypted content using substitute key $K_s$. However, the content consumer maintains an index 209 mapping hashes to conversion values ($H_s \rightarrow K_c$). Given the computed hash value $H_s$, the content consumer looks up a corresponding correction value $K_c$. If a correction value is found, the content consumer calculates media key $K_m$ from the substitute key $K_s$ and the correction value $K_c$ using known function f, where $f(K_s, K_c)=K_m$.

If no correction value is found, the content consumer may consult delta key server 207 via a network for a list 208 of available correction values. In some embodiments, the list of correction values maps hashes to conversion values ($H_s \rightarrow K_c$). In some embodiments, the list is timestamped so that the content consumer may retrieve the list only where an update is available. In some embodiments, the list is provided by a delta key server accessible through a computer network such as a LAN or the Internet. The list provided by such a key server may change over time. In this manner, the availability of encrypted content can be limited to a particular release date. Once correction values 210 are obtained from delta key server 207, they may be cached in index 209 and applied as discussed above to future encrypted content.

The substitute key may be distributed in a manner that restricts access to a subset of all consumers. For example, the substitute key may be distributed via NNL or a PKI scheme. An attacker in possession of a hash $H_s$, is not able to compute $K_s$ or $K_m$. The hash only allows identification of the correct correction value. In some embodiments, there may be hash collisions between multiple keys. In other embodiments, the delta key server may omit the hash values entirely. In such embodiments, the content consumer tries all available correction values $K_c$ until one is successful in decrypting the encrypted content. In some embodiments, the encrypted content is distributed with a verification block that allows a content consumer to identify the correct key. Hashes and correction values need not be a secret because they are useful only in conjunction with substitute key $K_s$. Thus, in some embodiments, delta key server 207 does not implement any access control. In some embodiments, correction list 208 is provided with a digital signature for the verification of authenticity.

As noted above, the contents of correction list 208 may vary over time. Existing items may be removed from the list available from delta key server 207, effectively revoking access to previously-accessible content. In addition, a content provider may provide several substitute keys $K_s$ for several groups of recipients, and each group may be independently provided with the correction value necessary to derive the media key. The correction values may be provided according to different schedules or via different mechanisms. In this way, multiple content consumers may be separated into multiple release groups.

In some embodiments, a content consumer requests and receives the entire correction list 208. In such embodiments, it cannot be inferred which content the consumer is attempting to decrypt. The correction list may be distributed via a peer to peer network, which further ensures the confidentiality of the content consumer by eliminating all direct interaction with the key server.

In some embodiments, dummy values are included in correction list 208 so that an attacker cannot infer which correction values correspond to a legitimate substitute key. The size of list 208 may thus be independent of the number of substitute keys distributed.

In an exemplary embodiment, the media key $K_m$ is a predetermined 128 bit key. The substitute key $K_s$ is a randomly determined 128 bits. Correction value $K_c=K_m$ xor $K_s$, and so media key $K_m$ may be computed by the content consumer as $K_m=K_c$ xor $K_s$. Hash value $H_s$ may be 16 bits comprising the xor value of every 2-byte pair within $K_s$. In this example, 18 bytes are required for each entry in correction list 208. In a system with 100,000 distinct pieces of content, each encrypted for two separate groups, 3,600,000 bytes (~3.4mb) are required for the complete list. Assuming that the substitute keys are of uniform randomness, each possible 16 bit hash value will appear on average once for every 65536 distinct $K_s$. Thus, 0.5 attempts may be predicted for every 65536 records in the correction list.

In some embodiments, the encrypted content is distributed with a verification block that allows a content consumer to verify whether the correct $K_m$ has been derived. In other embodiments, the verification block may be included with the correction list 208 for retrieval by content consumer 204. In either case, hash $H_s$ may be omitted from correction list 208 and correction index 209. Instead, content consumer 204 may try each $K_c$ in sequence until the correct $K_m$ is calculated. [0035] In some embodiments, $H_s$ is not computed from $K_s$. Instead, $H_s$ may be computed from a predetermined value or label, and still serve as an index to correction list 208 and correction index 209. In some embodiments, the predetermined value may be preshared. In other embodiments, $H_s$ may be included with substitute key 205. In yet other embodiments, a label may be included with substitute key 205 for computation of $H_s$ by the content consumer 204.

In some embodiments, the correction values ($K_c$) are indexed by more than one value. In an exemplary embodiment, the correction values are first indexed by a predetermined value such as a hash of a media identifier. In such embodiments, the correction values are further indexed by one or more values such as $H_s$, the hash of the substitute key, $K_s$. $K_c$ may be found by determining an index value, and using that index value to determine a set of potential $K_c$ values. The index value may be a hash of a media ID. The potential $K_c$ values may be determined by looking up the index value in an index. $K_c$ may then be further determined by looking up a second index value in the index. The second index value may be a hash $H_s$ of substitute key $K_s$. In some embodiments, the index of correction values $K_c$ may be implemented as a linked list, a tree, a database table, or structured data. Structured data may include a blob or other binary data with fixed offsets associated with each field. In some embodiments, multiple indices may be used to determine $K_c$, for example, three indices may be required to select a single $K_c$.

In some embodiments each substitute key $K_{s1} \ldots K_{sn}$ may be related to the others by a function. Each $K_{sn}$ may be encrypted in a subset difference tree or in a Media Key Block (MKB) according to another broadcast encryption scheme. Broadcast encryption schemes include matrix based scheme such as used in CPPM and CPRM and NNL based schemes such as used in AACS. Each $K_{cn}$ may be applicable to a given $K_s$. In such embodiments, a content consumer applies its device keys to determine one or more $K_s$ from the MKB. The content consumer may then determine subsequent $K_{sn}$ to the extent that it is related by a predetermined function. This process may be repeated until a substitute key is derived for which $K_c$ is known, or for a finite number of iterations. $K_{sn}$ and $K_c$ may then be used to determine $K_m$ as discussed above. In such embodiments, arbitrary $K_{sn}$ later in the chain may be revoked.

In some embodiments, substitute key $K_s$ may be pseudorandom. As a result, correction values $K_c$ may also be pseudorandom. However, in other embodiments, substitute keys $K_s$ may be related by a predetermined function. In such embodiments, for substitute key $K_{s1} \ldots K_{sn}$, $K_{sn}=f(K_{sn-1})$. Where function f is known to content consumer 204, subsequent substitute keys may be derived. Media key $K_m$ may then be determined based on correction values retrieved from key server 207 and one of substitute keys $K_s$. If there is no $K_c$ available that is applicable to $K_s$ or subsequent $K_s$, $K_m$ cannot be derived from $K_s$ or subsequent $K_s$. This enables revocation of the end of a chain of values, thereby protecting a plurality of classes of content or ranges of devices.

Figure 3:
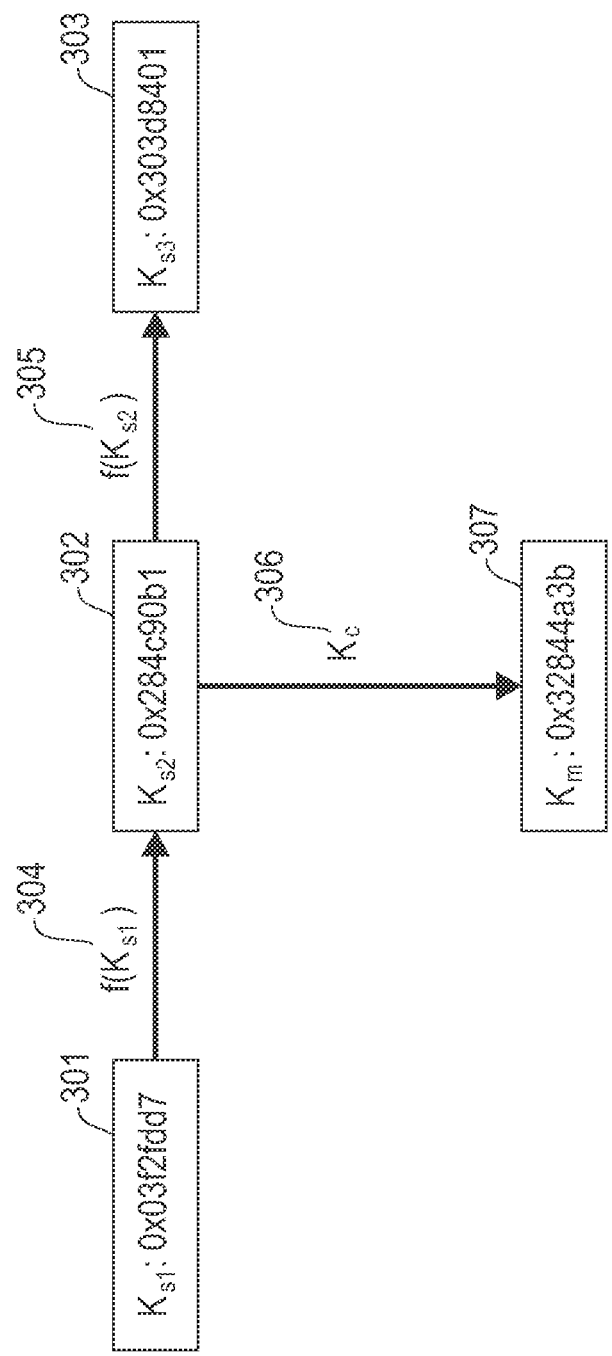
FIG. 3 depicts an exemplary arrangement of keys according to an embodiment of the present disclosure.

FIG. 3 depicts an exemplary arrangement of related substitute keys. In this arrangement, keys 301, 302, 303 are related by a predetermined function, f. Application 304 of the predetermined function f, to $K_{s1}$ yields $K_{s2}$ 302. Application 305 of function f to $K_{s2}$ 302 in turn yields $K_{s3}$ 303. Application 306 of correction value $K_c$ to $K_{s2}$ 302 yield $K_m$ 307. In this arrangement, where function f is a one way function, a content consumer in possession of $K_{s3}$ cannot derive $K_{s2}$, and thus cannot derive $K_m$. However, a content consumer in possession of $K_{s1}$ is able to derive $K_m$.

In some embodiments, correction list 208 of key server 207 contains a plurality of correction values, each correction value being a member of a different chain. In this manner, key server 207 may provide selective access to different classes of content by providing one correction value in each chain. Content consumer 204 may derive subsequent correction values in each chain represented in correction list 208, but may not derive prior correction values.

Figure 4:
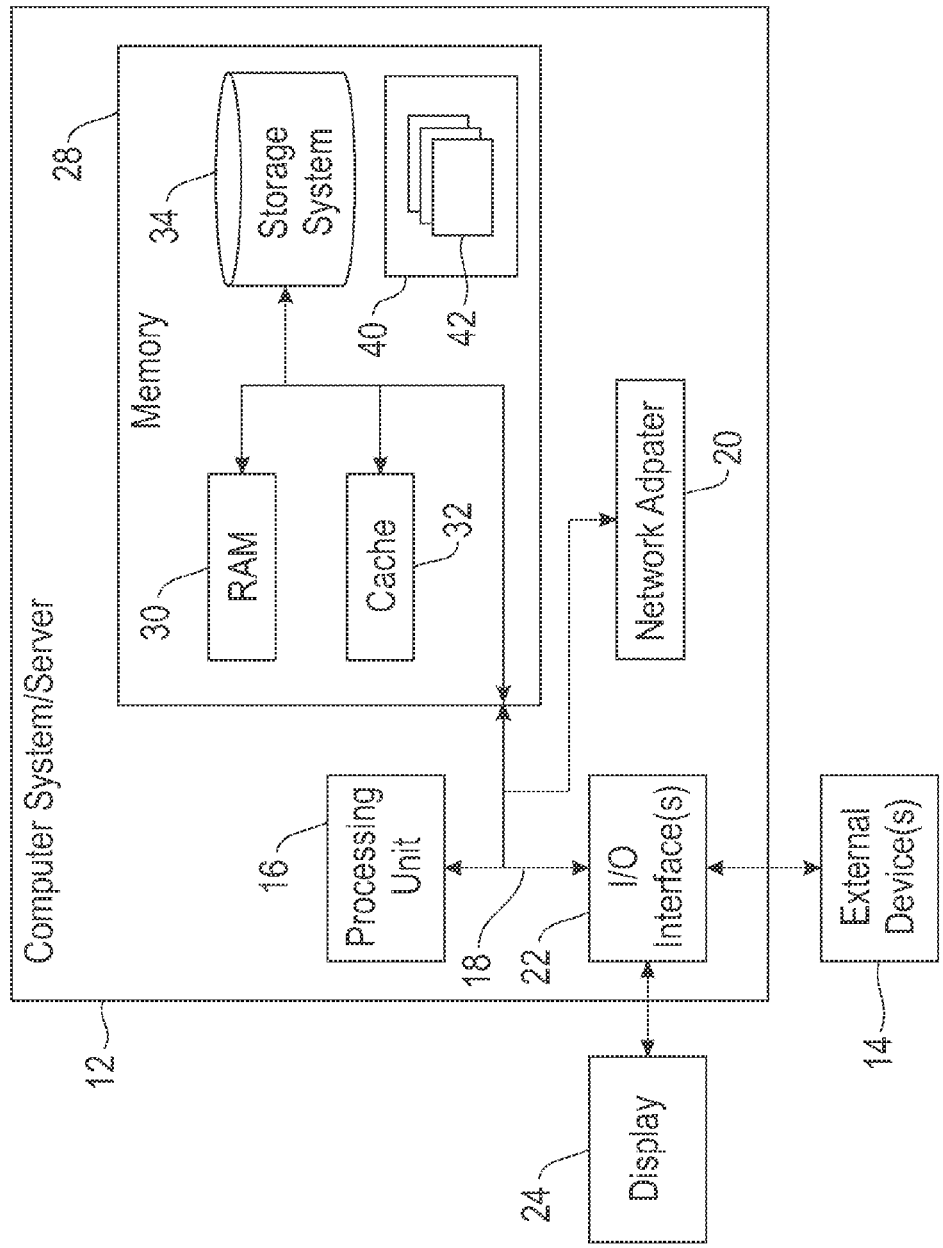
FIG. 4 depicts a computing node according to an embodiment of the present invention.

Referring now to FIG. 4, a schematic of an example of a computing node according to an embodiment of the present invention is provided. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 4, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving a first cryptographic key;
   computing a hash value of the first cryptographic key;
   receiving encrypted content encoded in a machine-readable medium, wherein the content was encoded utilizing a second cryptographic key;
   receiving, separate from the first cryptographic key, a plurality of correction values, wherein each of the plurality of correction values is indexed by pairing each of the plurality of correction values with at least one hash value;
   selecting a correction value from the plurality of correction values based on the first cryptographic key by matching the hash value of the first cryptographic key with the at least one hash value paired with the correction value, wherein selecting the correction value further comprises:
     determining a plurality of index values; and
     looking up the correction value in an index using the plurality of index values;
   applying a predetermined function to the first cryptographic key and the correction value to determine the second cryptographic key; and applying the second cryptographic key to the encrypted content to obtain decrypted content.

2. The method of claim 1, wherein the first cryptographic key is encoded in the machine-readable medium.

3. The method of claim 1, wherein the plurality of correction values is received via a computer network from a remote server.

4. The method of claim 1, wherein the correction value determines the second cryptographic key when applied to the first cryptographic key.

5. The method of claim 1, wherein the plurality of correction values are received at a predetermined time, thereby enabling decryption of the encrypted content after the predetermined time.

6. The method of claim 1, wherein the plurality of correction values are received according to a predetermined schedule.

7. The method of claim 1, wherein the first cryptographic key comprises a pseudorandom value.

8. A method comprising:
  randomly determining a first cryptographic key;
  computing the at least one hash value of the first cryptographic key;
  pairing the at least one hash value with the correction value;
  encrypting content with a second cryptographic key to obtain encrypted content;
  providing the encrypted content;
  providing the first cryptographic key; and
  providing, separate from the first cryptographic key, a plurality of correction values comprising the correction value, the correction value being selectable from the plurality of correction values based on the first cryptographic key and a by matching a hash value of the first cryptographic key with the at least one hash value paired with the correction value, wherein the selecting comprises:
    determining a plurality of index values; and
    looking up the correction value in an index using the plurality of index values.

9. The method of claim 8, wherein the encrypted content and the first cryptographic key are provided on a non-transitory machine-readable medium.

10. The method of claim 8, wherein the correction value is provided via a network connected server.

11. The method of claim 8, wherein the correction value is provided at a predetermined time, thereby enabling decryption of the encrypted content after the predetermined time.

12. The method of claim 8, wherein the correction value is provided according to a predetermined schedule.

13. The method of claim 8, wherein the first cryptographic key comprises a pseudorandom value.

14. A computer program product for time-embargoed content distribution, the computer program product comprising a non-transitory computer readable storage medium having program code embodied therewith, the program code executable by a processor to:
  receive a first cryptographic key;
  compute a hash value of the first cryptographic key;
  receive encrypted content encoded in a machine-readable medium, wherein the content was encoded utilizing a second cryptographic key;
  receive, separate from the first cryptographic key, a plurality of correction values, wherein each of the plurality of correction values is indexed by pairing each of the plurality of correction values with at least one hash value;
  select a correction value from the plurality of correction values based on the first cryptographic key by matching the hash value of the first cryptographic key with the at least one hash value paired with the correction value, wherein the select of the correction value further comprises:
    determine a plurality of index values; and
    look up the correction value in an index using the plurality of index values;
  apply a predetermined function to the first cryptographic key and the correction value to determine the second cryptographic key; and
  apply the second cryptographic key to the encrypted content to obtain decrypted content.

* * * * *